Jan. 2, 1962 R. THYEN 3,015,805

CIRCUIT ARRANGEMENT FOR ENCODING DEVICES

Filed Sept. 11, 1957 4 Sheets-Sheet 1

INVENTOR
R. Thyen

BY

ATTORNEY

Jan. 2, 1962 R. THYEN 3,015,805

CIRCUIT ARRANGEMENT FOR ENCODING DEVICES

Filed Sept. 11, 1957 4 Sheets-Sheet 2

INVENTOR

R. Thyen

BY Albert Pers

ATTORNEY

Jan. 2, 1962 R. THYEN 3,015,805

CIRCUIT ARRANGEMENT FOR ENCODING DEVICES

Filed Sept. 11, 1957 4 Sheets-Sheet 3

INVENTOR

R. Thyen

BY Albert Reiss

ATTORNEY

Jan. 2, 1962 R. THYEN 3,015,805

CIRCUIT ARRANGEMENT FOR ENCODING DEVICES

Filed Sept. 11, 1957 4 Sheets-Sheet 4

INVENTOR

R. Thyen

BY Albert Reiss

ATTORNEY

United States Patent Office 3,015,805

Patented Jan. 2, 1962

3,015,805

CIRCUIT ARRANGEMENT FOR ENCODING DEVICES

Rainer Thyen, Hirschlanden, Germany, assignor to International Standard Electric Corporation, New York, N.Y., a corporation of Delaware Filed Sept. 11, 1957, Ser. No. 683,353

Claims priority, application Germany Sept. 19, 1956

8 Claims. (Cl. 340—147)

This invention relates to encoding devices and, more particularly, to apparatus for checking the existence of a given number of code conditions out of a predetermined number thereof.

In the telecommunication art it is often the case that signals are transmitted in an encoded fashion. This is the situation, for example, in toll dialling systems, or else for the transmission of certain signals and orders in remote control systems. Generally, the encoding not only brings about an acceleration of the transmission process, but also provides a certain security against faulty switching operations. To this end it is often necessary that the encoded signals be checked with respect to their composition. For example, when in a frequency code the individual signals always consist of a combination of two frequencies out of a group of five different frequencies, then the check proves whether in a received signal there are actually contained exactly two, no more or no less frequencies or, stated in another way, it is to be checked whether in an *n* out of *m* code, of the *m* possibly occurring conditions there are simultaneously met *n* different conditions. By means of such a check, a safeguard is provided and faulty signals can be suppressed and faulty switching operations can be avoided.

For accomplishing a check of the received signals it is a common practice in conventional types of systems to respectively assign relays to the individual partial signals, and to assemble in circuit the contacts of these relays to form either rows of contacts or contact trees in such a way that only upon the simultaneous actuation of a predetermined number of *n* relays, e.g., in the presence of the proper code, a controlling relay will be caused to become effective, which is adapted to either release or initiate the actual switching operation. However, in many cases it is impossible to assign a special relay to each possible partial signal. In such a case the above-mentioned checking devices will fail to operate. This is the case, for instance, when a signal is not represented by the state of excitation of relays but, for example, by the application of predetermined potentials to a number of predetermined points. Electronic circuit arrangements are known in which, for characterizing a certain condition or for releasing a certain process or operation, the control points are connected in such a way via rectifiers to a common connecting point that the voltage appearing at the common connecting point, when feeding the same voltage to all control points, will differ from the voltage appearing at the common connecting point when only some, but not all of the control points are supplied with this voltage. With the aid of this circuit arrangement it is thus possible to release a switching operation when all of the connected control points at the same time have the same condition. If it is intended to employ such arrangements for each of the different possibilities of combination of the respectively employed code, then this would entail a great financial expenditure. On the other hand there are also known electronic circuit arrangements which, upon the modulation of only one control point of a number of control points cause the release of a switching operation. In this way, however, a checking of the code cannot be achieved. The present invention is particularly concerned with a circuit arrangement for encoding devices adapted to perform a checking as to the simultaneous existence of *n* conditions of a plurality of *m* possible different conditions. In this respect it is taken for granted that the existence or the non-existence respectively, of a circuit condition is indicated by two defined circuit conditions of the *m* switching elements to be checked. The inventive arrangement is featured by a step-by-step checking effected with the aid of electric pass-arrangements in such a way that in a first stage the checking "*n* out of *m*" is returned to a checking $(m-n+1)$ to be carried out in a second stage. In this way there will be achieved a simple and a well-arranged setup of the circuit.

In the following, the invention will be described in particular with reference to the accompanying drawings, wherein.

This invention will be explained in connection with a 2 out of 5 code, but it will be understood that the inventive system may be used with any other suitable code.

Figure 1:
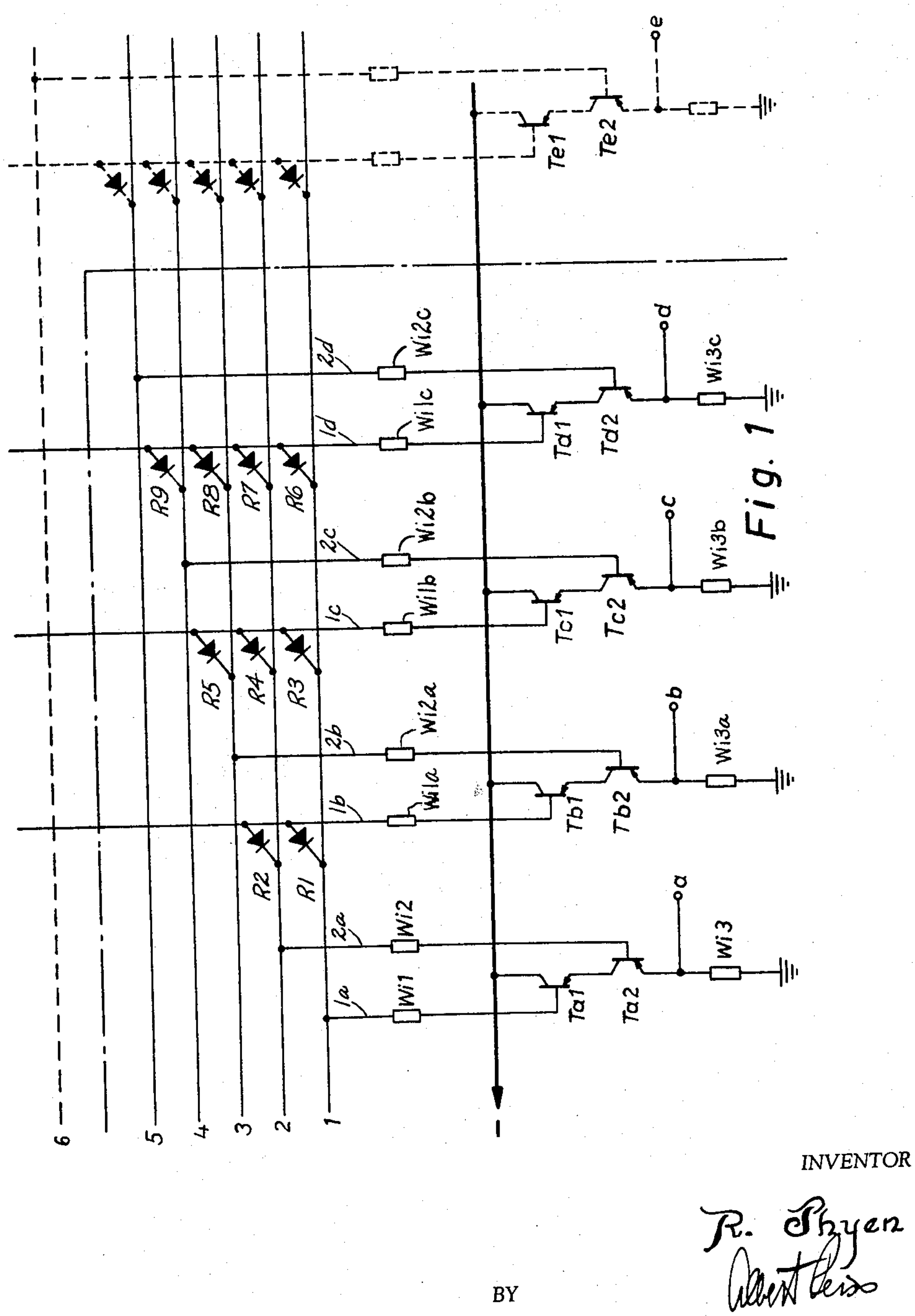
FIG. 1 is a schematic diagram of a circuit arrangement for checking of a 2 out of 5 code in the first stage, and the possibility of enlarging the arrangement for effecting the checking of a 2 out of 6 code, according to the invention.

Referring now to FIG. 1, there is shown schematically a plurality of control lines 1–5, each of which is adapted to assume one of two possible electrical conditions, either zero potential or negative potential. Connecting lines 2*a*, 2*b*, 2*c* and 2*d* are connected between lines 2, 3, 4 and 5 and one end of resistances W*i*2, W*i*2*a*, W*i*2*b* and W*i*2*c*, respectively. Connecting line 1*a* is connected between one end of resistance W*i*1 and line 1. Connecting line 1*b* is shown connected between one end of resistance W*i*1*a* and lines 1 and 2 via rectifiers R1 and R2, respectively. Connecting line 1*c* is connected between one end of resistance W*i*1*b* and lines 1, 2 and 3, via rectifiers R3, R4 and R5, respectively. Connecting line 1*d* is connected between one end of resistance W*i*1*c* and lines 1–4, via rectifiers R6 . . . R9, respectively. The other ends of resistances W*i*1, W*i*2 are connected to the base electrodes of transistors T*a*1, T*a*2, respectively. The other ends of resistances W*i*1*a*, W*i*2*a*; W*i*1*b*, W*i*2*b*; and W*i*1*c*, W*i*2*c*, are correspondingly connected to the base electrodes of transistors T*b*1, T*b*2, T*c*1, T*c*2 and T*d*1, T*d*2, respectively. It will be seen that the transistor pairs are connected so that the collector electrodes of transistors T*a*2, T*b*2, T*c*2 and T*d*2 are connected to the emitter electrodes of transistors T*a*1, T*b*1, T*c*1 and T*d*1, respectively. The emitter electrodes of transistors T*a*2, T*b*2, T*c*2 and T*d*2 are connected to positive potential (represented as ground) via resistances *Wi3*, *Wi3a*, *Wi3b* and *Wi3c*, respectively. The collector electrodes of transistors T*a*1, T*b*1, T*c*1 and T*d*1 are connected to a negative potential bus NB. An output from the transistor pair T*a*1, T*a*2 is taken from the junction of the load resistance W*i*3 and the emitter of transistor T*a*2 and is designated terminal "*a*." Similar output terminals *b*, *c* and *d* are taken from corresponding connections of resistances W*i*3*a*, W*i*3*b* and W*i*3*c* with transistors T*b*2, T*c*2 and T*d*2, respectively. Each of the checking circuits therefore comprises a chain of two transistors and there are $m-n+1$ chains, or in the case of a 2 out of 5 code, $5-2+1$ or four chains.

If, on the control line 1, for example, there appears a negative potential then, across the resistance W*i*1, the transistor T*a*1 of the first chain will be unblocked and brought into the conductive state, i.e. the emitter-collector gap of this transistor will develop a low impedance. Since the second transistor of the gap T*a*2 still has a high backward resistance, the unblocking of the transistor T*a*1 will remain ineffective to result in an output at the output terminal *a* so that no negative pulse may be derived therefrom. However, if a negative potential also appears on the control line 2, across the resistance W*i*2, to the base electrode of the second transistor T*a*2, this transistor also becomes unblocked and conducts and develops a low impedance. Since both transistors are now conducting, a voltage drop appears across load resistance W*i*3 and a negative-going output pulse appears at output terminal *a*. Since in none of the remaining chains of transistors are both transistors unblocked simultaneously over the control lines 1 and 2, no output pulses will appear at any of the remaining output terminals *b–d*.

Figure 2:
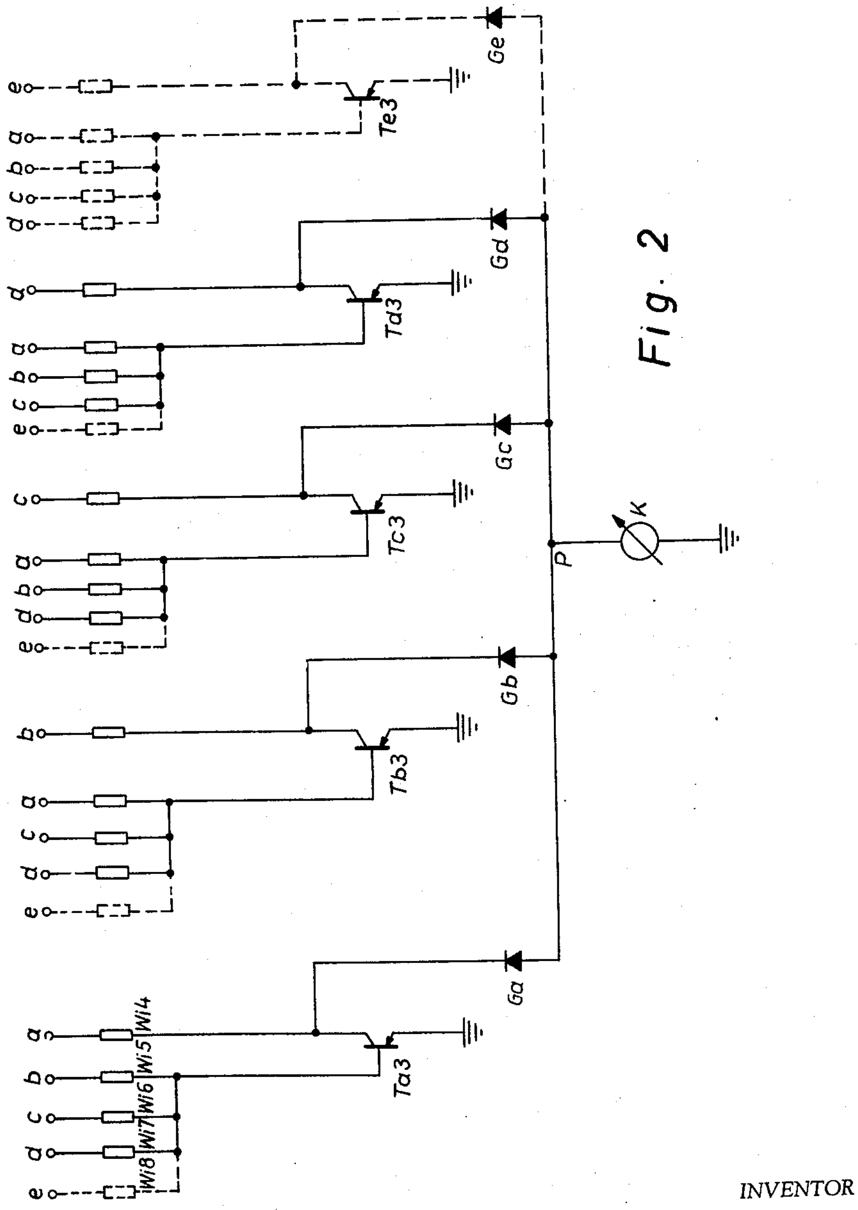
FIG. 2 is a schematic diagram of a circuit arrangement for checking a 1 out of 4 or 1 out of 5 code respectively, in the second stage, according to the invention.

In a modified arrangement according to FIG. 2 the output indication derived from the circuit of FIG. 1, may be checked as to whether actually only one of the output terminals *a–d* has the predetermined condition, i.e. negative potential. To this end there is provided in the second stage an additional group of transistors T*a*3, T*b*3, T*c*3, T*d*3, there being one transistor for each chain of transistors of the first stage. The emitter of transistor T*a*3 for the first chain consisting of the transistors T*a*1 and T*a*2, is connected to plus potential, whereas the collector is connected with the output terminal *a* across the resistance W*i*4. The base of the transistor T*a*3 is connected across the resistances W*i*5, W*i*6, W*i*7 to the connecting points *b*, *c* and *d*. In the corresponding manner there is provided for the second chain of transistors T*b*1, T*b*2 in FIG. 1 the transistor T*b*3 (FIG. 2) in the second stage, whose collector is connected with the output terminal *b*, and whose base is connected with the remaining terminals, namely *a*, *c* and *b*. Correspondingly, the electrodes of transistors T*c*3 and T*d*3 are similarly connected as shown.

Supposing now that the encoding had been carried out properly, i.e. that in the chosen example a negative potential had been derived only at the output terminal *a*, while positive potential is applied to the remaining connecting points *b*, *c* and *d*. In this case, the potential of point *a* flows through the resistance W*i*4 and via the rectifier G*a* to the common point P, which thus becomes negative and permits the utilization device K to operate.

If, however, in the first stage a second chain of transistors were erroneously operated, then the transistor T*a*3 would operate since a positive potential would no longer appear on its base electrode, so that a negative potential would be prevented from appearing at the common point P, and the device K could then not be affected or acted upon thereby. In this way a switching operation will only be permitted, or a signal will only be given in the presence or existence of the proper code, viz. when only one of the chains of transistors of the first stage is operated, and when a negative potential appears on only one of the four outlets *a–d*.

Figure 3:
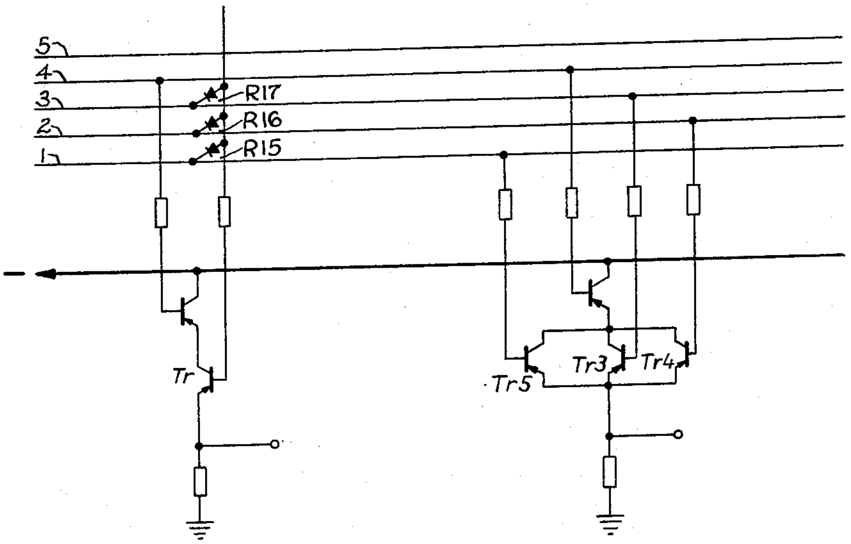
FIG. 3 is a schematic diagram of two circuit details of the arrangement, which are equivalent and may be inter-exchanged.

In FIG. 1 the first transistors of the chains are utilized in a multiple manner, i.e. they are assigned in common to a plurality of control lines. In this arrangement care has to be taken that the control lines are decoupled with respect to one another. This is accomplished by the insertion of rectifiers R1 . . . R9, as will be seen in FIG. 1. However, it is also possible to dispense with this decoupling, and to directly assign a transistor to each individual control line. These transistors will then have to be shunted among each other. Such an equivalent circuit arrangement is shown in FIG. 3 of the drawings, wherein the transistor T*r*1 is assigned to line 4 and transistor T*r*2 is assigned in common to the control lines 1, 2 and 3. The control lines are decoupled with respect to one another by the insertion of three rectifiers R15–R17. In the right-hand portion of the drawing each of the control lines 1, 2 and 3 is provided with respectively a transistor T*r*5, T*r*4, and T*r*3 of its own. Transistors T*r*3, T*r*4 and T*r*5 are connected in parallel and, in this way, replace the decoupling rectifiers previously mentioned. The transistor T*r*6 and the transistors T*r*3, T*r*4 and T*r*5 are connected in a manner similar to any of the chains in FIG. 1.

Figure 4:
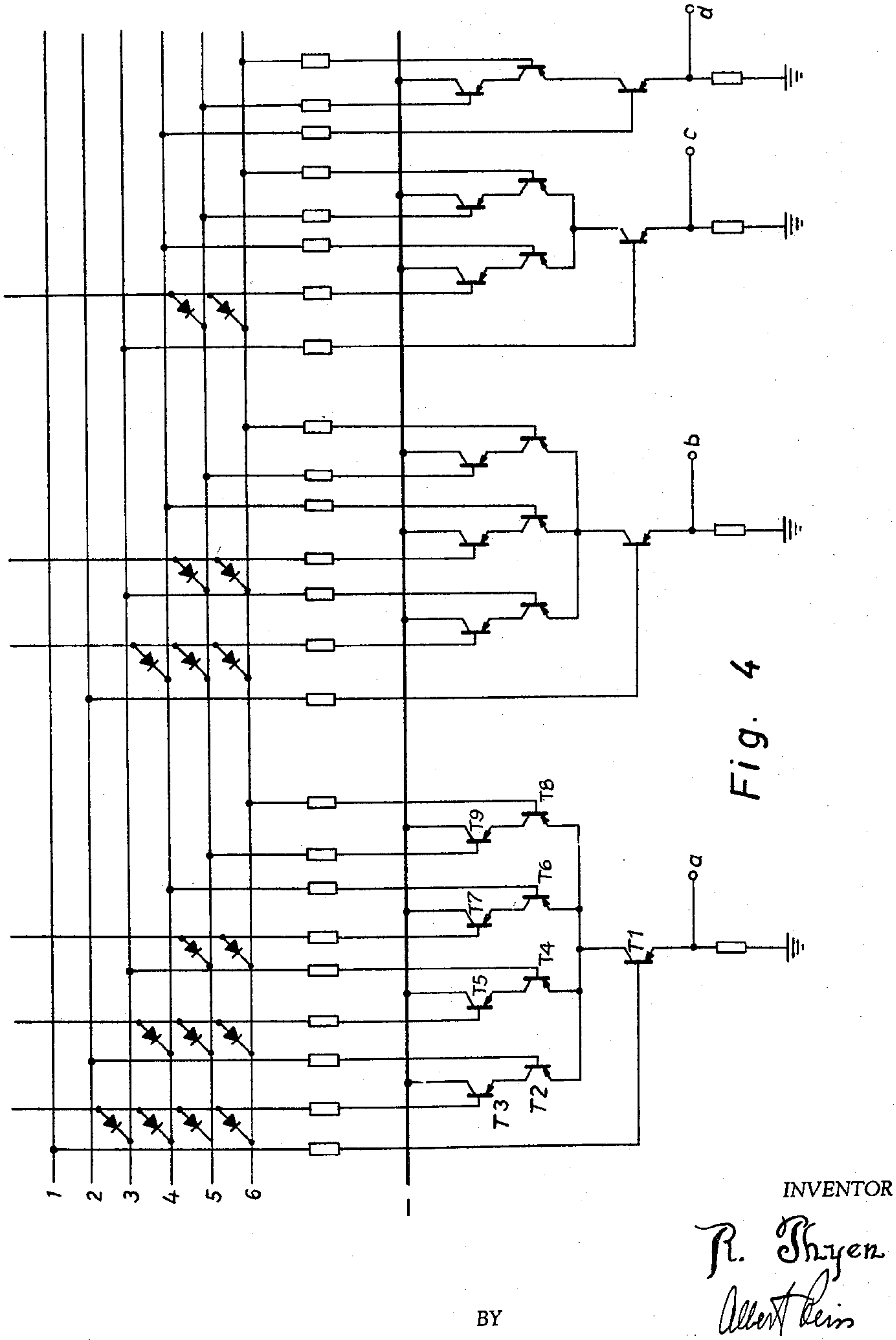
FIG. 4 is a schematic diagram of a circuit arrangement for the checking of the 3 out of 6 code, according to the invention.

In FIG. 4, there is shown a circuit arrangement for the checking of a 3 out of 6 code. As will be readily seen from the illustrations there are provided in this case, according to the code, chains of respectively $n=3$ series-connected transistors, e.g. T1, T2, T3; T1, T4, T5; the arrangement being made in such a way that in the first chain there is provided in common the transistors T1 for all of those possibilities of combination, in which the control line 1 is excited by a coding potential. The transistor T2, in turn, is provided in common for all of those cases in which, besides the control line 1, the control line 2 is also excited by a coding potential. Also the transistor T3 is subjected to a multiple utilization and is at the common disposal of the control lines 3 through 6. In this case, of course, and as described in the foregoing, the control lines 3 through 6 are mutually decoupled by means of the rectifiers as shown. In a following chain of transistors, T4 and T5 with common transistor T1, there are seized all those possibilities in which, besides the control line 1, the control line 3, is excited by a coding potential, but the control line 2 remains unexcited. The chain circuit using transistors T8 and T9 terminates in the circuit for the checking of the combination of the control lines 1, 5 and 6.

In a next following main group of chain circuits there are assembled all those possibilities in which, by the exclusion of control line 1, there are characterized the control line 2 and two other control lines. The conformity with the law, as to how the further groups of transistor chains are connected, will be evident from the drawing. Since in the groups of chain circuits there is respectively provided in common a transistor, e.g. the transistor T1, for the first group, there will be obtained for the $m-n+1$ groups of chain circuits also $m-n+1$ characterizing outlets. With respect to the example chosen in FIG. 4 for the 3 out of 6 code there will be obtained according to this formula $6-3+1=4$ characterizing outlets. As in the preceding drawings, these outlets are again denoted *a* through *d*. In a further circuit arrangement similar to that of FIG. 2, a check may be made to determine if only one of these outlets is characterized.

It will be appreciated that the inventive arrangement can easily be adapted to enable the checking of any other code in addition to those used for the purposes of illustration. Thus, as is shown in FIG. 1 outside the dot-and-dash line, it is possible to amend the arrangement for permitting a checking of a 2 out of 6 code. This, of course, requires a further chain of transistors T*e*1 and T*e*2, which serves to control the application of a negative pulse at terminal *e*. In a corresponding manner also in FIG. 2 there will have to be provided a further transistor T*e*3, and with all other transistors a further connecting point *e*. These alternative arrangements are shown in FIG. 2 by way of dash lines. It will be seen that this arrangement can be readily continued. The possibility of enlarging the arrangement will also be clearly recognized from FIG. 4 of the drawings. Of course, it is also possible to employ, instead of the transistors as shown in the exemplified embodiment, any other switch elements of either the static or the dynamic types.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An error checking arrangement for an electric circuit having a plurality of $m$ points which are arranged to be marked in permuted sets with a marking on a predetermined fixed number $n$ of markings per set whereby the said points are marked in an $n$ out of $m$ code, comprising a plurality of chains of $n$ electrical switches, a control circuit for each switch in a chain, $m-n+1$ output circuits connected respectively to the last switches of different chains, means for connecting control circuits of at least one corresponding switch in each chain respectively to different ones of said $m$ points, means for connecting control circuits of corresponding other switches in said chain respectively to different combinations of said $m$ points excluding the point to which the control circuit of said one switch of that chain is connected, whereby a control voltage is produced on the output circuit connected to a chain when the $n$ points to which the control circuits of that chain are connected are simultaneously marked, a second set of $(m-n+1)$ switches, control means connecting said second set of switches with said output circuits, a utilization device, and means connecting said utilization device in common to said second switches whereby said utilization device is rendered ineffective when more than one of said control voltages is applied to said second set of switches.

2. An error checking arrangment according to claim 1 in which each of the switches of said second set has first and second input terminals, means for applying to the first input terminals of each switch in the second set the control voltage derived from the corresponding chain of switches in the first set, the second input terminal of each switch in the second set being connected in common to the chains of the other switches of the first set.

3. An arrangement as claimed in claim 2 wherein a rectifier matrix is provided for coupling the switches of said chains to said conductors for the purpose of decoupling said chains each from the other.

4. An arrangement as claimed in claim 2, further comprising a source of operating potential, said chains being coupled to said conductors through a plurality of individual switch elements each of which is coupled in a series-parallel circuit between a different one of said conductors and another common switch element, said series-parallel circuit extending across said potential source.

5. An arrangement as claimed in claim 2, further comprising a source of potential, each of said chains comprising a pair of serially connected electronic switches each having at least one control electrode and connected across said source, each switch having a control electrode coupled to a different one of said conductors.

6. An arrangement as claimed in claim 2, each of said chains further comprising a common load resistance in the series path between said switches and said source, and an output terminal intermediate said resistance and one of said switches.

7. An arrangement as claimed in claim 2 in which each switch of said second set of switches is an electronic switch whose conductivity is controlled by two electrodes, means coupling one of said electrodes to the output of a corresponding chain of switches in the first mentioned chain and for coupling the other electrode in common to the outputs of the remaining chains of switches in the first mentioned chain.

8. An arrangement according to claim 7 in which decoupling means are provided intermediate said second switches and said utilization device.

References Cited in the file of this patent

UNITED STATES PATENTS

| | | |
|---|---|---|
| 2,460,702 | Mallery | Feb. 1, 1949 |
| 2,470,145 | Clos | May 17, 1949 |
| 2,484,226 | Holden | Oct. 11, 1949 |
| 2,550,600 | Rehm | Apr. 24, 1951 |
| 2,655,625 | Burton | Oct. 13, 1953 |
| 2,682,573 | Hunt | June 29, 1954 |
| 2,716,230 | Oliwa | Aug. 23, 1955 |
| 2,790,600 | Dersch | Apr. 30, 1957 |